United States Patent [19]

Malaval et al.

[11] 4,104,122

[45] Aug. 1, 1978

[54] LIQUID ABSORBENT SAFETY DEVICE FOR A NUCLEAR REACTOR

[75] Inventors: Claude Malaval, Antony; Jean-Loup Picou, L'Hay Les Roses, both of France

[73] Assignee: Groupement Atomique Alsacienne Atlantique, Le Plessis Robinson, France

[21] Appl. No.: 636,463

[22] Filed: Dec. 1, 1975

Related U.S. Application Data

[63] Continuation of Ser. No. 366,921, Jun. 3, 1973, abandoned.

[30] Foreign Application Priority Data

Jun. 2, 1972 [FR] France .................................. 72.19989

[51] Int. Cl.² .............................................. G21C 7/22
[52] U.S. Cl. ............................ 176/86 L; 176/DIG. 5
[58] Field of Search .................. 176/86 L, 22, DIG. 5

[56] References Cited

U.S. PATENT DOCUMENTS

| 2,990,353 | 6/1961 | Howard et al. ..................... 176/86 L |
| 3,498,881 | 3/1970 | Siddall ............................... 176/86 L |
| 3,773,619 | 11/1973 | Harrington et al. ............... 176/86 L |

*Primary Examiner*—Harvey E. Behrend
*Attorney, Agent, or Firm*—Sughrue, Rothwell, Mion, Zinn and Macpeak

[57] ABSTRACT

A liquid absorbent safety device for a nuclear reactor, constituted by a cylindrical tank comprising two communicating superposed compartments. The upper compartment situated above the reactor is filled with liquid absorbent surmounted by a gas under pressure. The lower compartment situated in the core is filled with gas under pressure and is provided with a connection to the outside terminated by a closing member sensitive to the operating conditions of the reactor. If the reactor begins to malfunction, the closing member is destroyed thereby causing depressurization of the lower compartment and the precipitation of the liquid absorbent into the lower compartment.

6 Claims, 1 Drawing Figure

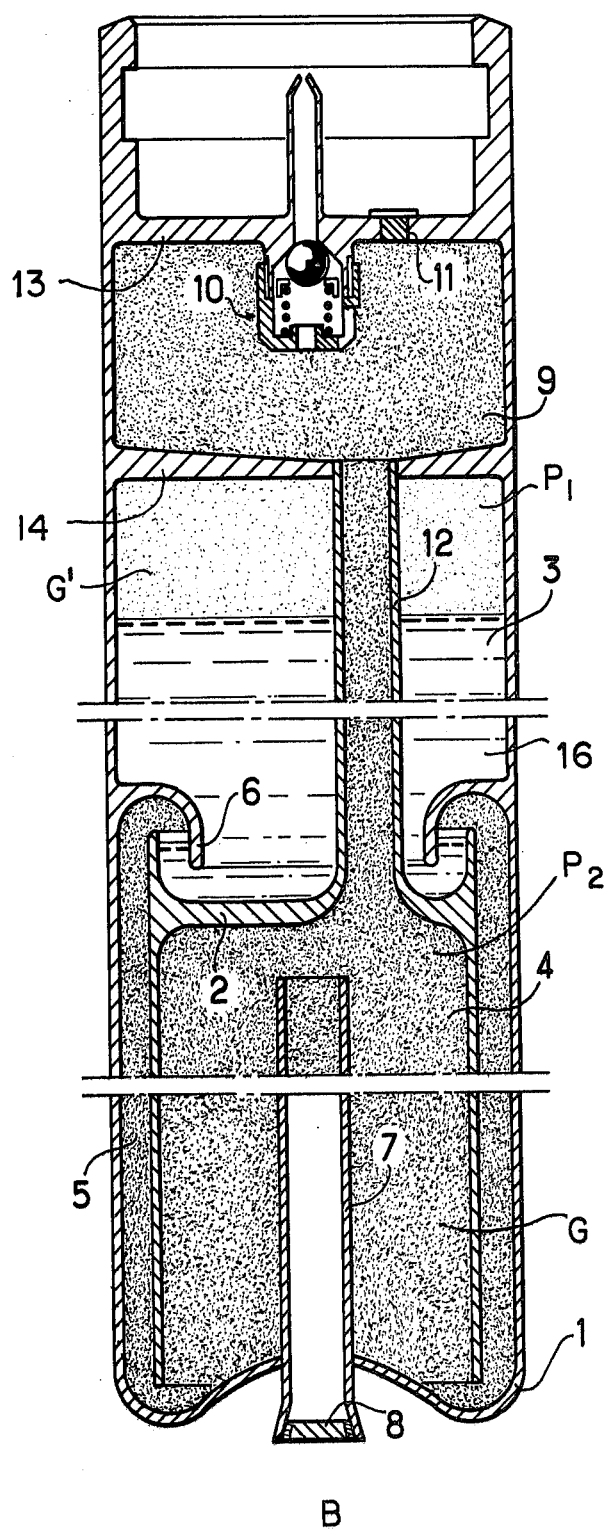
B

LIQUID ABSORBENT SAFETY DEVICE FOR A NUCLEAR REACTOR

This is a continuation of application Ser. No. 366,921, filed Jun. 3, 1973, now abandoned.

BACKGROUND OF THE INVENTION

1. Field of the Invention

The present invention relates to a safety device designed to lower the reactivity of a nuclear reactor by the extremely rapid introduction of a liquid absorbant into a space located in the core of the reactor.

2. Prior Art

The devices for arresting a reactor by introducing a liquid absorbent have the advantage over the conventional devices such as control rods in that they are able to function even in the event of an explosion or a serious accident in the reactor.

Certain of the known liquid absorbent arresting devices operate by injecting the absorbent directly into the liquid refrigerant or into the moderator. It is then very difficult to extract the absorbent from the moderator and absorbent separation devices are very cumbersome and costly.

In the case of other known devices, the absorbent circulates in the pipes crossing right through the reactor. The absorbent is kept ready without the core of the reactor by means of gas pressure and the supply of absorbent is stored outside the reactor in a drum governed by gas pressure. All that is required to force the absorbent into the pipes crossing the core of the reactor is to rapidly increase the gas pressure in the drum or to reduce the pressure keeping the absorbent out of the core of the reactor.

These devices have the disadvantage of requiring external manipulation to set them into operation. Furthermore, the liquid-filled pipes are relatively long which produces charging losses and sluggishness of the flow of liquid. This prejudices a rapid response and calls for very high pressures. In addition, this sluggishness has a detrimental effect at the end of the flow course thus necessitating the use of damping devices to check the flow of liquid.

SUMMARY OF THE INVENTION

The object of the present invention is to obviate the above disadvantages and to provide a liquid absorbent safety device, which is set into operation automatically and which only uses a quantity of liquid corresponding to a liquid column the height of the core. On account of the low inertia of this column, the liquid absorbent can be rapidly displaced and arrested without requiring a complicated checking operation.

The liquid absorbent safety device according to the invention consists of a vertical, cylindrical tank comprising two superposed, communicating compartments. The upper compartment situated in the reactor above the core is filled with liquid absorbent surmounted by a gas under pressure $P_1$. The lower compartment situated in the core of the reactor is filled with a gas under a pressure $P_2$, which is slightly greater than the pressure $P_1$. The lower compartment is provided with a connection to the outside terminated by a closing member situated in the core of the reactor. The tightness of this closing member depends on the operating conditions of the reactor.

As soon as the reactor begins to malfunction (due to a breakdown of the cooling circuit, an explosion etc...), the closing member is partially destroyed and the lower compartment is rapidly depressurized so that the liquid absorbent is injected into the lower compartment under the effect of the pressure which still prevails in the upper compartment.

The choice of closing member depends on the parameter which it is desired to keep under surveillance in the reactor. According to a first embodiment, a fusible uranium cap sensitive to the neutronic flow and brased on its periphery with a fusible metal, is used. According to a second embodiment intended for gas reactors, a pressure-sensitive membrane is used.

According to a feature of the invention, the connection terminated by the closing member crosses the lower wall of the lower compartment and is extended in the interior of the lower compartment by a vertical pipe, the upper end of which is close to the top of the lower compartment.

Accordingly, when the absorbent liquid has been ejected into the lower compartment after the seal tightness of the closing member has broken, it remains trapped in the lower compartment. The vertical pipe prevents the liquid absorbent from escaping via the connection which is now open and from being distributed in the core of the reactor.

An embodiment of the device according to the invention is illustrated in the drawing in a sectional view by way of a non-limitative example.

DESCRIPTION OF THE PREFERRED EMBODIMENT

The safety device represented in the single FIGURE comprises a vertical, cylindrical tank 1 divided approximately in half by a partition 2 into an upper compartment 3 and a lower compartment 4.

The lower compartment 4 is slightly higher than the core of the reactor in which it is placed. The upper compartment 3 is thus placed above the core of the reactor.

The two compartments are in communication by way of an annular conduit 5 tangential to the inner walls of the tank 1 and commencing at the base of the lower compartment 4 and opening into the upper compartment 3 at the partition 2 by way of a siphon device 6.

The lower compartment 4 is provided with a vertical pipe 7 having the same axis as the tank. The upper end of the pipe 7 is adjacent to the partition 2 and the lower end opens outside the tank 1 and is sealed by a closing member 8 consisting of a uranium cap brased on its periphery with a fusible metal B at a predetermined temperature. The tank 1 is surmounted by a container 9 defined by horizontal or transverse partitions 12 and 13 of low volume. This container is provided with a valve 10 and a sealable oriface 11 at its upper part. This container 9 communicates with the lower compartment 4 via a vertical pipe 12 displaced with respect to the axis of the tank 1 and crossing the upper compartment 3 which is defined by horizontal or transverse partitions 2 and 12.

The tank is advantageously disposed in a casing (not shown) identical to the one used for the fuel.

The safety device according to the invention operates as follows:

As the tank 1 is disposed outside the reactor, the liquid absorbent, for example, lithium 16, is poured through the opening 11 until the liquid comes to below the upper part of the vertical pipe 7 in the lower compartment 4. The opening 11 is then sealed.

The tank 1 is put under pressure by injecting gas G, for example argon or helium, by way of the valve 10 so that the liquid 16 rises through the annular conduit 5 into the upper compartment 3. When all the liquid 16 has passed into the upper compartment 3 and the pressure of the gas G in the lower compartment 4 is clearly greater than the pressure prevailing in the core of the reactor, the gas inlet is opened and the valve 10 closes. It is then possible to seal the mouth of the latter.

The gas G in the upper compartment is then at a pressure $P_1$, which is slightly lower than the pressure $P_2$ prevailing in the lower compartment, the pressure difference $P_2 - P_1$ being equal to the pressure exerted by the column of liquid.

The tank is then lowered in a casing (not shown) into the core of the reactor containing the fuel. In reality only the lower compartment is disposed in the core, the upper compartment being disposed above the core.

In the case of rapid reactors the tank is immersed in a liquid refrigerant, for example, liquid sodium.

When the uranium cap 8 is subjected to a normal neutronic flow, it remains at a lower temperature than the fusion point of the brazing and the liquid absorbant remains in the upper compartment 3 above the core of the reactor.

If the reactor becomes overreactive, the neutronic flow becomes prohibitive and the cap 8 heats up and the brazing melts. The cap is then ejected by the effect of the gas pressure into the lower compartment 4. There is a rapid drop in pressure in the lower compartment 4 and the liquid absorbent is precipitated into this compartment by the effect of the pneumatic relaxation of the gas contained in the upper compartment 3. The liquid absorbent comes up to below the upper end of the vertical pipe 7 and remains trapped in the lower compartment.

The safety device according to the invention acts to a certain extent as a fuse which almost instantaneously produces a lowering of the reactivity of the reactor.

It is obvious that, even in the event of an explosion causing mechanical deformation of the core, the liquid absorbent is able to descend into the lower compartment 4.

The releasing of the device is extremely reliable in view of the fact that it does not require an external operation or the use of an energy source outside the reactor.

In the case of gas reactors, the uranium cap may be replaced in certain safety devices by a pressure-sensitive membrane.

Tanks provided with membranes are lowered into the core without being put under pressure and without sealing the valve 10.

When the gas reactor is pressurized, a pressure equal to the pressure in the reactor is obtained in the lower compartment 4 by way of the valve 10 and the liquid absorbent is introduced into the upper compartment 3.

The membrane is sensitive to any frop in pressure in the reactor and as soon as the pressure drops below a predetermined value, the membrane breaks. The gas escapes from the lower compartment 4 and the liquid absorbent is precipitated into this compartment.

Although the safety device described is most advantageous when used in the embodiment according to the invention, it can obviously be modified in various ways without departing from the scope of the invention and certain elements contained therein may be replaced by others capable of ensuring the same technical function or an equivalent technical function.

What is claimed is:

1. A safety shut down assembly for a nuclear reactor including a reactor core, said safety shut down assembly comprising:

a vertical, closed, cylindrical casing for partial vertical placement within the reactor core, a first horizontal, transverse partition dividing said casing into vertically upper and lower compartments, means communicating said compartments, said upper compartment being located in said reactor above the core, a liquid absorbent within said casing in an amount initially nearly filling said lower compartment, said lower compartment being situated in the core of said reactor, means for gas pressurization of the lower compartment for forcing liquid absorbent through said communicating means and into said upper compartment, an axial vertical pipe extending through said cylindrical casing within said lower compartment and having an end external of said cylindrical casing closed off by a closing member defining a physically destructible seal whose destruction is directly responsive to a predetermined neutronic flow corresponding to a reactor malfunction;

whereby, destruction of said closure seal opens said lower compartment directly to the reactor core to cause liquid absorbent stored within the upper compartment to move into the lower compartment for shut down of said reactor.

2. A safety shut down assembly according to claim 1, wherein: the closing member is a uranium cap brased on its periphery with a fusible metal to said connection.

3. A safety shut down assembly according to claim 1, wherein: said axial vertical pipe extends through the lower compartment and terminates close to the transverse partition separating the lower compartment from the upper compartment.

4. A safety shut down assembly according to claim 1, wherein: said closing member comprises a uranium cap brased on its periphery with a fusible metal to the lower end of said axial vertical pipe to form said destructible seal.

5. A safety shut down assembly according to claim 1, further comprising second and third vertically spaced horizontal partitions within said casing, said second partition defining with said casing and said first partition said upper compartment, and said second and third partitions forming a gas entry chamber above said upper compartment, a check valve within said third partition for introducing gas into said casing by way of said gas entry chamber, and vertical pipe means extending between said first partition and said second partition, for fluid communicating said gas entry chamber to said lower compartment.

6. A safety shut down assembly according to claim 1, wherein: said upper and lower compartments are in fluid communication by an annular wall extending from a position just above the bottom of said lower compartment to said first partition and forming therewith a siphon device, said casing including a second partition, said second partition defining a gas entry chamber above said second compartment and said gas pressurization means comprises a vertical tube fluid communicating the gas entry chamber to the lower compartment and permitting liquid absorbent within the lower compartment to move into the upper compartment through the annular passage between the annular wall and the casing wall and said siphon device for storage therein in response to gas pressurization of said vertical, cylindrical casing.

* * * * *